(12) United States Patent
Weiny et al.

(10) Patent No.: US 10,348,428 B2
(45) Date of Patent: Jul. 9, 2019

(54) TECHNIQUES FOR SYNCHRONIZED EXECUTION OF A COMMAND AT NETWORK FABRIC NODES

(71) Applicant: Intel Corporation, Santa Clara, CA (US)

(72) Inventors: Ira Weiny, Livermore, CA (US); Steven R. Carbonari, Beaverton, OR (US); Alexander W. Min, Portland, OR (US); Tsung-yuan C. Tai, Portland, OR (US); Brian J. Skerry, Gilbert, AZ (US); Patrick Connor, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 630 days.

(21) Appl. No.: 14/582,075

(22) Filed: Dec. 23, 2014

(65) Prior Publication Data
US 2016/0182177 A1    Jun. 23, 2016

(51) Int. Cl.
| | |
|---|---|
| *H04L 12/24* | (2006.01) |
| *H04L 12/851* | (2013.01) |
| *H04J 3/06* | (2006.01) |
| *H04L 12/46* | (2006.01) |
| *H04L 29/08* | (2006.01) |
| *H04L 12/947* | (2013.01) |
| *H04L 12/757* | (2013.01) |
| *H04L 12/841* | (2013.01) |

(52) U.S. Cl.
CPC ........ *H04J 3/0661* (2013.01); *H04L 12/4641* (2013.01); *H04L 67/325* (2013.01); *H04L 67/34* (2013.01); *H04L 45/023* (2013.01); *H04L 47/28* (2013.01); *H04L 49/25* (2013.01)

(58) Field of Classification Search
CPC ...... H04J 3/0638; H04J 3/0641; H04J 3/0667; H04J 3/0673; H04J 3/0635; H04J 3/0655; H04J 3/0682; H04J 3/0697
See application file for complete search history.

(56) References Cited

U.S. PATENT DOCUMENTS 9,407,733 B1 *   8/2016   Mizrahi ............... H04L 69/22
2002/0150039 A1   10/2002   Valdevit
(Continued)

FOREIGN PATENT DOCUMENTS

| CN | 1328744 A | 12/2001 |
|---|---|---|
| CN | 1653761 A | 8/2005 |

(Continued)

OTHER PUBLICATIONS

Infiniband Architecture specification vol. 1, Release 1.2.1, Nov. 2007 Release, pp. 1-1727.*

(Continued)

*Primary Examiner* — Romani Ohri

(57) ABSTRACT

Examples may include techniques to enable synchronized execution of a command by nodes in a network fabric. A node capable of hosting a fabric manager for the network fabric (fabric manager node) may generate one or more packets including a command to be executed by at least some nodes in the network fabric. In some examples, a time stamp is also included with at least one of the one or more packets to indicate to receiving nodes to execute the command at a synchronized time.

24 Claims, 11 Drawing Sheets

(56) References Cited

U.S. PATENT DOCUMENTS

| | | |
|---|---|---|
| 2005/0276216 A1 | 12/2005 | Vasseur et al. |
| 2007/0038999 A1 | 2/2007 | Millington |
| 2008/0037511 A1* | 2/2008 | Casati ................ H04L 12/1881 370/350 |
| 2009/0097439 A1* | 4/2009 | Lee .................... H04W 56/009 370/328 |
| 2012/0252503 A1* | 10/2012 | Wu .......................... G01S 5/10 455/456.6 |
| 2014/0241344 A1* | 8/2014 | Menes ................. H04J 3/0673 370/355 |
| 2014/0314099 A1 | 10/2014 | Dress |
| 2015/0304865 A1* | 10/2015 | Poscher ............... H04W 76/02 370/252 |

FOREIGN PATENT DOCUMENTS

| | | |
|---|---|---|
| JP | 19962789 | 7/1997 |
| JP | H10341195 | 12/1998 |
| JP | 2000161113 | 6/2000 |

OTHER PUBLICATIONS

IEEE standard for a precision clock synchronization Protocol for networked measurement and control systems published on Jul. 24, 2008, pp. 1-289. IEEE instrumentation and measurement society.*

Extended European Search Report received for European Patent Application No. 15196148.9, dated Jun. 24, 2016, 6 pages.

Office Action received for Japanese Patent Application No. 2015-227798, dated Nov. 8, 2016, 6 pages including 3 pages English translation.

Guay et al., "Host Side Dynamic Configuration with InfiniBand", Cluster Computing (CLUSTER), 2010 IEEE International Conference, Sep. 2010, 10 pages.

Notice of Allowance received for Korean Patent Application No. 10-2015-0163242, dated May 12, 2017, 6 pages.

Notice of Allowance received for Japanese Patent Application No. 2015-227798, dated Jun. 6, 2017, 3 pages.

* cited by examiner

Packet Format 400

| bytes | bits 31-24 | bits 23-16 | bits 15-8 | bit 7 | bits 6-0 |
|---|---|---|---|---|---|
| 0 | BaseVersion Field 410 | MgmtClass Field 412 | ClassVersion Field 414 | Response Field 416 | Method Field 418 |
| 4 | Status Field 422 | | | ClassSpecific Field 424 | |
| 8 | TransactionID Field 432 | | | | |
| 12 | | | | | |
| 16 | AttributeID Field 442 | | Indicator Field 444 | TimeStamp Field 446 | |
| 20 | AttributeModifier Field 452 | | | | |
| 24 | Data Field 462 | | | | |
| ... | | | | | |
| 252 | | | | | |

- DETERMINE, AT A FABRIC MANAGER NODE FOR A NETWORK FABRIC, A SEPARATE TIME PERIOD FOR EACH NODE COUPLED TO THE FABRIC MANAGER NODE TO RECEIVE AND EXECUTE A GIVEN COMMAND FROM THE FABRIC MANAGER NODE
  *602*

- GENERATE ONE OR MORE PACKETS INCLUDING A COMMAND FOR AT LEAST A PORTION OF NODES COUPLED TO THE FABRIC MANAGER NODE
  *604*

- DETERMINE A TIME INTERVAL NEEDED FOR ALL NODES OF THE PORTION OF NODES TO RECEIVE AND EXECUTE THE COMMAND BASED ON THE DETERMINED SEPARATE TIME PERIOD FOR EACH NODE
  *606*

- GENERATE A TIME STAMP BASED ON THE TIME INTERVAL
  *608*

- SEND THE ONE OR MORE PACKETS TO THE PORTION OF NODES AND INCLUDE THE TIME STAMP WITH AT LEAST ONE OF THE ONE OR MORE PACKETS TO INDICATE A SYNCHRONIZED TIME FOR THE PORTION OF NODES TO EXECUTE THE COMMAND
  *610*

*FIG. 6*

Storage Medium 700

*Computer Executable Instructions for 800*

FIG. 7

Storage Medium 1000

Computer Executable Instructions for 900

*FIG. 10*

TECHNIQUES FOR SYNCHRONIZED EXECUTION OF A COMMAND AT NETWORK FABRIC NODES

TECHNICAL FIELD

Examples described herein are generally related to a network fabric.

BACKGROUND

A network fabric may include a plurality of interconnected nodes. These nodes may include compute and/or switch nodes and may be arranged in various topologies. The various topologies or layouts may include from a few to possibly tens of thousands of nodes. A fabric manager controller may be hosted by at least one of the nodes in the network fabric to manage or control links and/or paths between nodes in the network fabric. The node hosting the fabric manager controller may be referred to as a fabric manager node and this fabric manager node may be capable of sending management commands to nodes in the network fabric that may cause nodes to reconfigure at least some aspects of a respective node's configuration for receiving, processing or sending data traffic through the network fabric.

BRIEF DESCRIPTION OF THE DRAWINGS

FIG. 4 illustrates an example packet format.
FIG. 6 illustrates an example of a first logic flow.
FIG. 7 illustrates an example of a first storage medium.
FIG. 10 illustrates an example of a second storage medium.

DETAILED DESCRIPTION

As contemplated in the present disclosure, a fabric manager node for a network fabric may be capable of sending management commands to nodes in the network fabric that may cause these nodes to reconfigure. Current implementations may include the fabric manager node sending packets including commands to each node individually to cause nodes to reconfigure. While these commands may be sent in parallel, network traffic and inherent latencies in the network fabric as well as possible limitations in a number of parallel commands that can be sent may cause the commands to be received by nodes at different times.

Receiving commands from a fabric manager node at different times may result in nodes executing the commands to reconfigure at unpredictable times. For example, nodes located several intermediate nodes from the fabric manager node may receive commands in a relatively longer time than nodes located closer to the fabric manager node. Also, network traffic congestion within some intermediary nodes may delay delivery of commands even if a given node is relatively close to the fabric manager node. The unpredictable times for each node reconfiguring may result in a period of time for which the network fabric is not fully configured. The not fully configured state may result in lost data or possibly a deadlock state that may necessitate a system reset of at least portions of the network fabric. It is with respect to these challenges that the examples described herein are needed.

According to some first examples, techniques for synchronized execution of a command at network fabric nodes may include determining, at a fabric manager node for a network fabric, a separate time period for each node coupled to the fabric manager node to receive and execute a given command from the fabric manager node. The techniques may also include generating one or more packets including a command for at least a portion of nodes coupled to the fabric manager node. The techniques may also include determining a time interval needed for all nodes of the portion of nodes to receive and execute the command based on the determined separate time period for each node and generating a time stamp based on the time interval. The techniques may also include sending the one or more packets to the portion of nodes and include the time stamp with at least one of the one or more packets to indicate a synchronized time for the portion of nodes to execute the command.

In some second examples, techniques for synchronized execution of a command at network fabric nodes may include receiving, at a node in a network fabric, one or more packets including a command. The techniques may also include determining a synchronized time for execution of the command with one or more other nodes in the network fabric based on a time stamp included in at least one of the one or more packets. The techniques may also include executing the command responsive to reaching the synchronized time.

Figure 1:
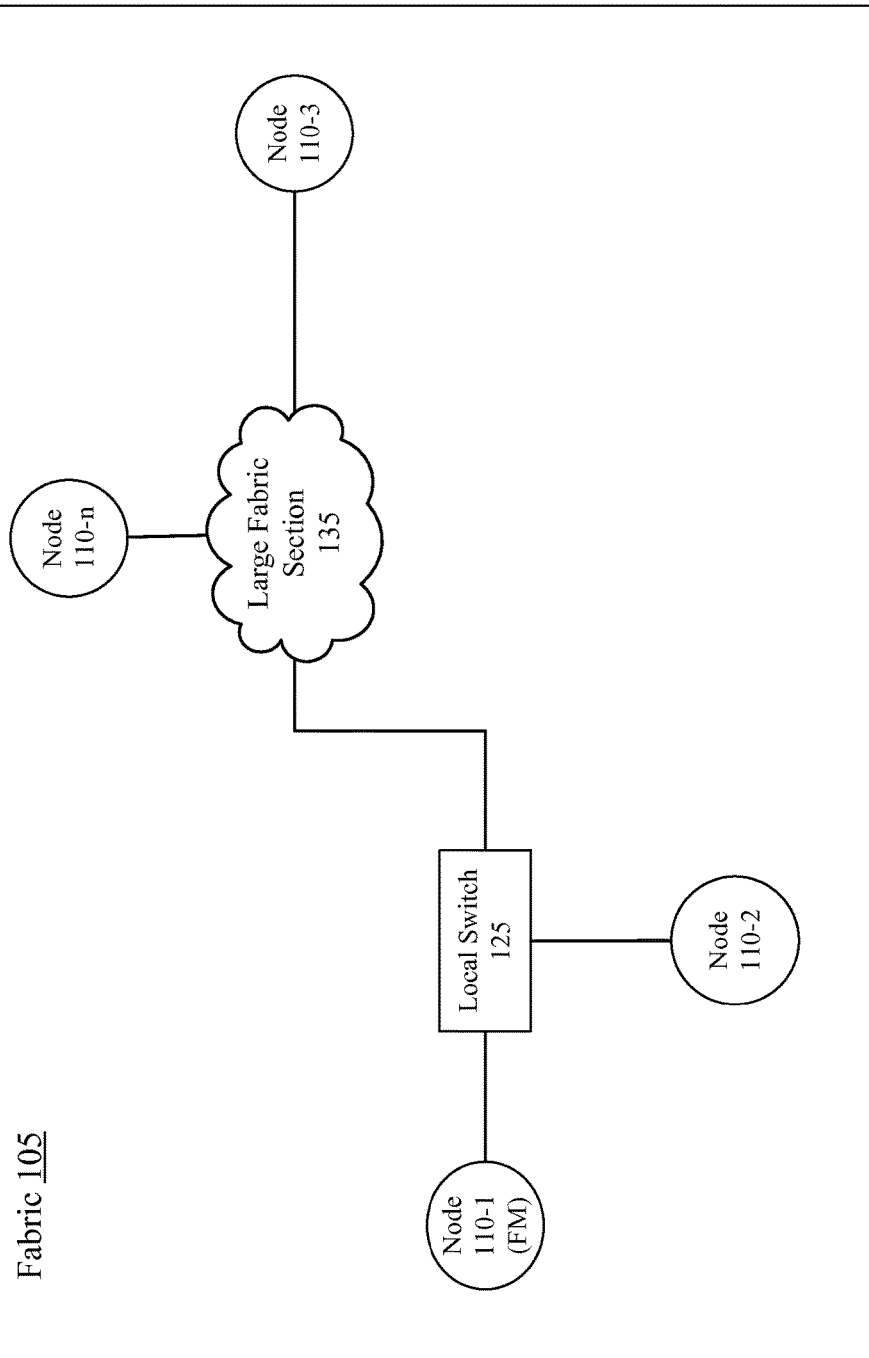
FIG. 1 illustrates an example system.

FIG. 1 illustrates an example system 100. In some examples, as shown in FIG. 1, system 100 includes a fabric 105. For these examples, fabric 105 is shown in FIG. 1 as including compute nodes 110-1, 110-2, 110-3 and 110-n, where "n" is any positive whole integer greater than 3. According to some examples, as shown in FIG. 1, nodes 110-1 to 110-n in fabric 105 may be interconnected either through a local switch 125 and/or through a large fabric section 135. Local switch 125 may be coupled directly to both nodes 110-1 and 110-2 while nodes 110-3 and 110-2 may couple to other nodes through large fabric section 135 and through local switch 125. Large fabric section 135 may include one or several intermediate nodes via which data traffic may traverse to reach nodes coupled to large fabric section 135.

In some examples, a fabric manager (FM) controller may be hosted and/or supported by a compute node such as node 110-1 as shown in FIG. 1. For these examples, node 110-1 may be arranged to serve as a fabric manager node for fabric 105 and nodes 110-2, 110-3 and 110-n may be arranged to function as compute nodes capable of receiving, processing or sending data traffic through fabric 105.

According to some examples, as shown in FIG. 1, node 110-2 is coupled to fabric 105 through a local switch 122. For these examples, node 110-2 may receive one or more packets including a command from fabric manager node 110-1 and may implement or execute the command more quickly than would nodes 110-3 and 110-n coupled to fabric manager node 110-1 through both local switch 125 and large fabric section 135. As mentioned previously, large fabric section 135 may include several intermediary nodes. These several intermediary nodes may delay delivery of the one or more packets including the command to nodes 110-3 or 110-*n* as compared to a more direct route between fabric manager node 110-1 and node 110-2.

In some examples, the command included in the one or more packets may include a reconfiguration command. The reconfiguration command may be to change or shift quality of service (QoS) levels for data traffic flowing between two or more nodes of fabric 105 and reconfiguring the data traffic flow over different links between the two or more nodes. For these examples, the different links may include one or more virtual channels between the two or more nodes via which the data traffic flow follows between the two or more nodes.

According to some examples, the command included in the one or more packets may include a reconfiguration command for changing routes or path for data packets to follow between two or more nodes. For these examples, routing changes may result in each node updating routing tables or other routing information used to send, receive or forward data packets through at least portions of fabric 105.

According to some examples, the QoS levels, the different links including one or more virtual channels or routing tables may be arranged according to one or more standards or specifications associated with Infiniband™ specifications including Infiniband Architecture Specification, Volume 1, Release 1.2.1, published in November 2007 ("the Infiniband Architecture specification"). Also, fabric 105 and nodes 110-1 to 110-*n* may be arranged to operate in compliance with the Infiniband Architecture specification. For these examples, the one or more packets including the reconfiguration command sent from fabric manager node 110-1 may be formatted as management datagrams (MADs) as described in the Infiniband Architecture specification. This disclosure is not limited to reconfiguration commands sent via MADs other formats associated with other standards are specification or proprietary fabrics are also contemplated.

In some examples, as described more below, one or more MADs may include time stamp information to enable nodes of fabric 105 to reconfigure at a synchronized time that may allow sufficient time for each node to receive the one or more MADs and execute a command sent from fabric manager node 110-1 at the synchronized time. For these examples, nodes 110-1 to 110-*n* may be arranged to operate in compliance with one or more standards or specifications associated with Institute of Electrical and Electronic Engineers (IEEE) 1588 standards including IEEE 1588-2008, published in July 2008 ("IEEE 1588"). Nodes 110-1 to 110-*n* may be capable of maintaining precise network time synchronization with the one or more other nodes according to IEEE 1588. This disclosure is not limited to network time synchronization according to only IEEE 1588, other methods or techniques for network synchronization are contemplated.

Figure 2:
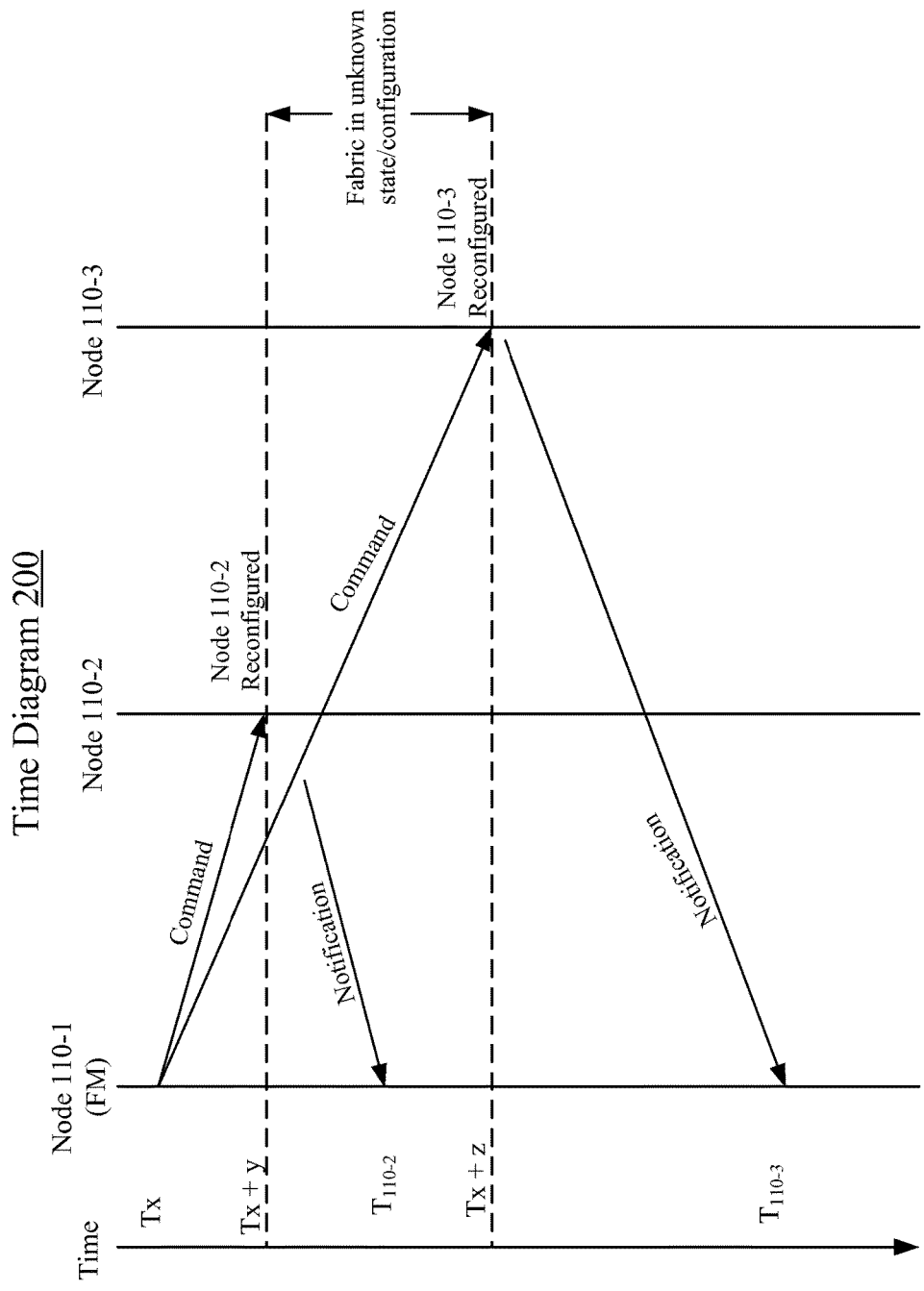
FIG. 2 illustrates an example first time diagram.

FIG. 2 illustrates an example first time diagram. As shown in FIG. 2, the first time diagram includes time diagram 200. Time diagram 200 as shown in FIG. 2 depicts an example of relative times for reconfiguration based on fabric manager node 110-1 of fabric 105 sending one or more packets (e.g., formatted as MADs) including a reconfiguration command to both nodes 110-2 and 110-3 at time Tx. A dashed-line at Tx+y may represent a first time for node 110-2 to receive the one or more packets and execute the reconfiguration command and T 110-2 indicates a second time when fabric manager 110-1 receives a notification from node 110-2 of completion of the reconfiguration. Another dashed-line at Tx+z may represent a third time for node 110-3 to receive the one or more packets and execute the reconfiguration command and T110-3 indicates a fourth time when fabric manager 110-1 receives a notification from node 110-3 of completion of the reconfiguration.

According to some examples, an amount of time between the two dashed-lines in FIG. 2 may represent a period of time for which fabric 105 may be in an unknown state or configuration. Therefore, for these examples, fabric 105 from time Tx+y to Tx+z (time between the two dashed-lines) may not be fully configured for either an old or new configuration.

In some examples, staggered or different reconfiguration times may be problematic from the perspective of intermediate nodes included in large fabric section 135. For these examples, intermediate nodes which are traversed by packets flowing from node 110-2 to node 110-3 may require a path or route change within large fabric section 135. For the time between the two dashed-lines, packets flowing from node 110-2 may not reach node 110-3 because intermediary nodes within large fabric section 135 may be forwarding the packets according to incorrect (old) routing information (e.g., maintained in routing tables). Not reaching node 110-3 due to incorrect (old) routing information may lead to deadlock. Deadlock may cause applications running at nodes 110-2 or 110-3 to fail. Also, deadlock may result in at least a portion of fabric 105 having to be reset to remove the deadlock. Resetting a portion or all of fabric 105 due to different reconfiguration time may lead to an undesirably high amount of jitter.

Figure 3:
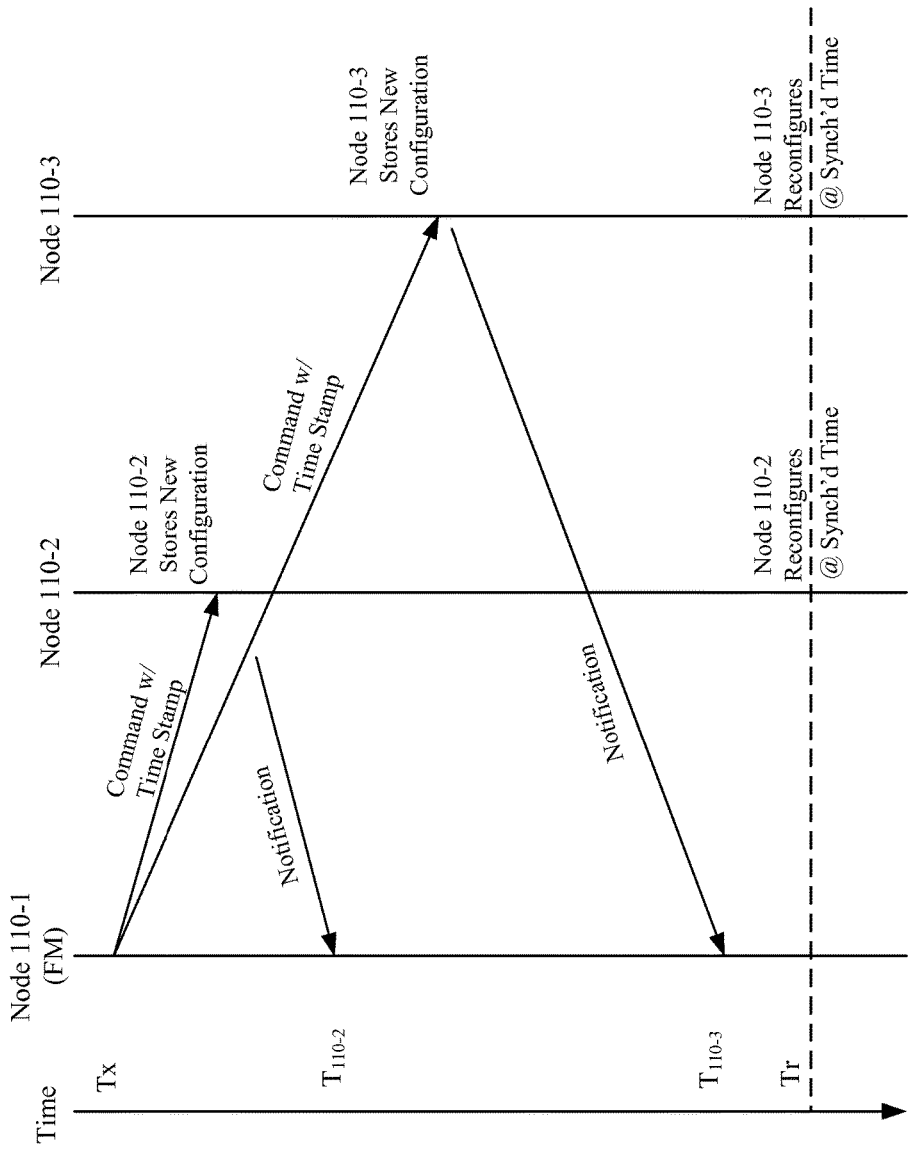
FIG. 3 illustrates an example second time diagram.

FIG. 3 illustrates an example second time diagram. As shown in FIG. 3, the second time diagram includes time diagram 300. In some examples, time diagram 300 as shown in FIG. 3 depicts an example of synchronized reconfiguration based on fabric manager node 110-1 of fabric 105 sending one or more packets (e.g., formatted as MADs) including a reconfiguration command to both nodes 110-2 and 110-3 at time Tx. For these examples, logic and/or features at fabric manager node 110-1 may include a time stamp with at least one of the one or more packets to enable logic and/or features at nodes 110-2 and 110-3 to determine a synchronized time for execution of the reconfiguration command.

In some examples, fabric manager node 110-1 may operate in compliance with the Infiniband Architecture specification and logic and/or features of fabric manager node 110-1 may be capable of determining a separate time period for each node of fabric 105 such as node 110-2, node 110-3 or node 110-*n* to receive and execute given commands sent from fabric manager node 110-1. For these examples, the separate time period for each node may be based, at least in part, on management timeout and response time values for each node to receive and respond to the given commands (e.g., sent via one or more MADs) from fabric manager node 110-1.

According to some examples, fabric manager node 110-1 may reconfigure at least a portion of fabric 105 that includes nodes 110-2 and 110-3 in a synchronized manner. For these examples, logic and/or features of fabric manager node 110-1 may generate one or more packets including a reconfiguration command. The logic and/or features of fabric manager node 110-1 may be capable of determining a time interval needed for both nodes 110-2 and 110-3 to receive and execute the reconfiguration command based on the separate time period for each of nodes 110-2 and 110-3 that was determined as mentioned above. The logic and/or features may then generate a time stamp based on the time interval and then cause the one or more packets to be sent to nodes 110-2 and 110-3. As shown in FIG. 3, in some examples, the time stamp may be included with at least one of the one or more packets and may indicate a synchronized time for nodes 110-2 and 110-3 to execute the reconfiguration command. Synchronization for nodes of fabric 105 may be maintained according to IEEE 1588 to ensure that nodes 110-2 and 110-3 execute the reconfiguration command in the synchronized manner.

In some examples, logic and/or features at nodes 110-2 or 110-3 may receive the one or more packets including the reconfiguration command and a time stamp included in at least one of the one or more packets. For these examples, as shown in FIG. 3, nodes 110-2 and 110-3 may then store or cache a new configuration indicated by the reconfiguration command. Nodes 110-2 and 110-3 may send respective notifications of receipt of the reconfiguration command and fabric manager node 110-1 may receive these notifications at $T_{110-2}$ and $T_{110-3}$, respectively. The logic and/or features at nodes 110-2 and 110-3 may then use the time stamp to determine the synchronized time for execution of the reconfiguration command and then execute the new configuration at Tr as depicted by the dashed-line in FIG. 3.

According to some examples, logic and/or features at fabric manager node 110-1 may include an indication in the one or more packets including the reconfiguration command that is recognized by logic and/or features at nodes 110-2 and 110-3 that a synchronized reconfiguration is to occur. In other words, the indication may cause the logic and/or features of nodes 110-2 and 110-3 to delay reconfiguration until a synchronized time is reached. During that delay each packet including information for the reconfiguration may be stored or cached as received by nodes 110-2 and 110-3. In some examples, the time stamp may not be included until the final or last packet of the one or more packets. Including the time stamp in the final or last packet may enable fabric manager node 110-1 to abort the reconfiguration if an error occurs before the final or last packet including the time stamp is sent to nodes 110-2 and 110-3. Also, the time stamp may be included in its own packet or may be included with packets also carrying a payload of reconfiguration information.

FIG. 4 illustrates an example packet format 400. In some examples, as shown in FIG. 4, packet format 400 may be similar to a MAD base format as described in the Infiniband Architecture specification. Bytes 0-3 of example packet format 400 may include a BaseVersion field 410, a Mgmt-Class field 412, a ClassVersion field 414, a Response field 416 and a Method field 418. Bytes 4-7 may include a Status field 422 and a ClassSpecific field 424. Bytes 8-12 may include a TransactionID field 432. Bytes 16-19 may include an attribute field 442, an indicator field 444 and a timestamp field 446. Bytes 20-23 may include an AttributeModifier field 452. Bytes 24 to 252 may include a Data field 462. Example packet format 400 may be used by a fabric manager node of a network fabric (e.g., fabric manager node 110-1) to send one or more packets including a command to nodes in the network fabric. This disclosure is not limited to example packet format 400, other example packet formats are contemplated that may include more or less fields and may also include more or less bytes than mentioned above for any particular field or fields.

In some examples, all of the above mentioned fields for bytes 0-252 except Indicator field 444 and TimeStamp field 446 may include information as described in the Infiniband Architecture specification for the MAD base format. For example, BaseVersion field 412 indicates a version of MAD base format, MgmtClass indicates class of operation, ClassVersion field 414 indicates a version of MAD class-specific format, Response Field 416 indicates a response bit, Method field 418 indicates a method to perform based on the management class, Status field 422 indicates a status of operation, ClassSpecific field 424 may indicate SubnetManagement class, TransactionID field 432 indicates a transaction identifier, AttributeID field 442 defines objects being operated on by a management class, AttributeModifier field 452 provides further scope to attributes and Data field 462 is the data or payload area for packets associated with management commands.

According to some examples, indicator field 444 of example packet format 400 may be a single bit field (e.g., bit 15) that indicates when set or asserted (e.g., it is 1) that a node receiving a packet in example packet format 400 is to delay execution of a command associated with the packet until a synchronized time is reached. For these examples, the synchronized time may be based on a time stamp included in TimeStamp field 446. As mentioned previously, the command may include a reconfiguration command. The time stamp included in TimeStamp field 446 may represent a time sufficiently in the future to allow all nodes receiving packet(s) associated with the reconfiguration command to receive the packet(s), temporarily store or cache information for the reconfiguration command (e.g., new configuration information) and then execute the reconfiguration command at the synchronized time.

In some examples, a first packet of a plurality of packets generated in example packet format 400 may include an indication in Indicator field 444 that receiving nodes are to delay execution of the command. However, TimeStamp field 446 may not include time stamp information. For these examples, the lack of a time stamp may indicate to receiving nodes to continue to temporarily store or cache information for executing the command until a subsequent packet in example packet format 400 is received that includes a time stamp in TimeStamp field 446. The subsequent packet including the time stamp may be received just after the first packet or several packets may be received without time stamps before the subsequent packet is received. The receiving nodes may then execute the command included in the plurality of packets at a synchronized time based on the time stamp included in the subsequent packet.

According to some examples, rather than include the time stamp in its own field, the time stamp may be included in Data field 462. For these examples, a first packet of a plurality of packets generated in example packet format 400 minus TimeStamp field 446 may include an indication in Indicator field 444 that receiving nodes are to delay execution of the command. For these examples, a lack of a time stamp in Data field 462 may indicate to receiving nodes to continue to temporarily store or cache information for executing the command until a subsequent packet in example packet format 400 is received that includes a time stamp in Data field 462. The subsequent packet including the time stamp may be received just after the first packet or several packets may be received without time stamps in Data field 462 before the subsequent packet is received. The receiving nodes may then execute the command included in the plurality of packets at a synchronized time based on the time stamp included in Data field 462 of the subsequent packet that may be the last or final packet.

Figure 5:
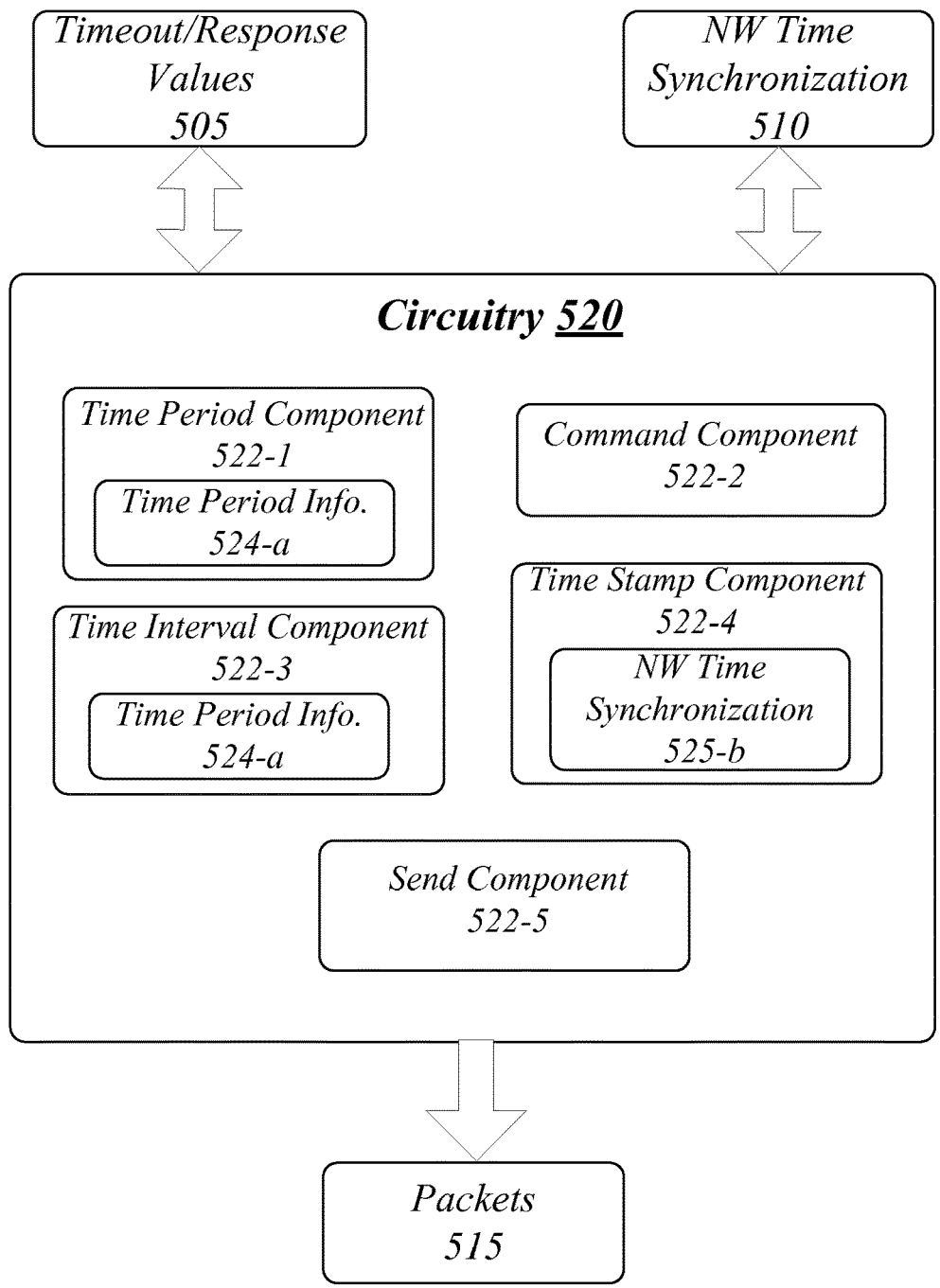
FIG. 5 illustrates an example block diagram for a first apparatus.

FIG. 5 illustrates an example block diagram for a first apparatus. As shown in FIG. 5, the first apparatus includes an apparatus 500. Although apparatus 500 shown in FIG. 5 has a limited number of elements in a certain topology, it may be appreciated that the apparatus 500 may include more or less elements in alternate topologies as desired for a given implementation.

According to some examples, apparatus 500 may be supported by circuitry 520 maintained at a node (e.g., computing node) in a network fabric capable of hosting or supporting a fabric manager for the network fabric. Circuitry 520 may be arranged to execute one or more software or firmware implemented modules or components 522-*a*. It is worthy to note that "a" and "b" and "c" and similar designators as used herein are intended to be variables representing any positive integer. Thus, for example, if an implementation sets a value for a=5, then a complete set of software or firmware for components 522-*a* may include components 522-1, 522-2, 522-3, 522-4 or 522-5. The examples presented are not limited in this context and the different variables used throughout may represent the same or different integer values. Also, these "components" may be software/firmware stored in computer-readable media, and although the components are shown in FIG. 5 as discrete boxes, this does not limit these components to storage in distinct computer-readable media components (e.g., a separate memory, etc.).

According to some examples, circuitry 520 may include a processor or processor circuitry. Circuitry 520 may be part of host processor circuitry at the node hosting the fabric manager node in the network fabric (e.g., node 110-1). Circuitry 520 may be generally arranged to execute one or more software components 522-*a*. Circuitry 520 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 520 may also include an application specific integrated circuit (ASIC) and at least some components 522-*a* may be implemented as hardware elements of the ASIC.

In some examples, apparatus 500 may include a time period component 522-1. Time period component 522-1 may be executed by circuitry 520 to determine a separate time period for each node coupled to the fabric manager node to receive and execute a given command from the fabric manager node. For these examples, timeout/response values 505 may be received that indicate management timeout and response time values for each node to receive and respond to the given command. The given command associated with timeout/response values 505 may be in a similar format as example packet format 400 (e.g., a MAD base format as described in the Infiniband Architecture specification). Time period component 522-1 may include the separate time period for each node with time period information 524-*a*. Time period information 524-*a* may be maintained by or assessable to time period component 522-1 via a data structure such as a lookup table (LUT).

According to some examples, apparatus 500 may also include a command component 522-2. Command component 522-2 may be executed by circuitry 520 to generate one or more packets including a command for at least a portion of nodes coupled to the fabric manager node. For these examples, the one or more packets may be in a similar format as example packet format 400.

In some examples, apparatus 500 may also include a time interval component 522-3. Time interval component 522-3 may be executed by circuitry 520 to determine a time interval needed for all nodes of the portion of nodes to receive and execute the command based on the determined separate time period for each node. For these examples, time interval component 522-3 may use the separate time period for each node maintained in time period information 524-*a* to determine the time interval.

According to some examples, apparatus 500 may also include a time stamp component 522-4. Time stamp component 522-4 may be executed by circuitry 520 to generate a time stamp based on the time interval. For these examples, network (NW) time synchronization 510 may include information obtained in accordance with IEEE 1588 to maintain NW time synchronization 525-*b*. Time stamp component 522-4 may maintain NW time synchronization 525-*b* via timing mechanisms according to IEEE 1588 and may generate the time stamp using NW time synchronization 525-*b*.

In some examples, apparatus 500 may also include a send component 522-5. Send component 522-5 may be executed by circuitry 520 to cause the one or more packets to be sent to the portion of nodes. For these examples, send component 522-5 may cause the time stamp to be included with at least one of the one or more packets. The time stamp may indicate a synchronized time for the portion of nodes to execute the command. Packets 515 may include the one or more packets to be sent to the portion of nodes and the synchronized time, as mentioned above, may be based on information included in NW time synchronization 525-*b*.

Various components of apparatus 500 and a device or node implementing apparatus 500 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 6 illustrates an example of a first logic flow. As shown in FIG. 6 the first logic flow includes a logic flow 600. Logic flow 600 may be representative of some or all of the operations executed by one or more logic, features, or devices described herein, such as apparatus 500. More particularly, logic flow 600 may be implemented by at least time period component 522-1, command component 522-2, time interval component 522-3, time stamp component 522-4 or send component 522-5.

According to some examples, logic flow 600 at block 602 may determine, at a fabric manager node of a network fabric, a separate time period for each node coupled to the fabric manager node to receive and execute a given command from the fabric manager node. For these examples, time period component 522-1 may determine the separate time period for each node.

In some examples, logic flow 600 at block 604 may generate one or more packets including a command for at least a portion of nodes coupled to the fabric manager node. For these examples, command component 522-2 may generate the one or more packets including the command (e.g., a reconfiguration command).

According to some examples, logic flow 600 at block 606 may determine a time interval needed for all nodes of the portion of nodes to receive and execute the command based on the determined separate time period for each node. For these examples, time interval component 522-3 may determine the time interval needed.

In some examples, logic flow 600 at block 608 may generate a time stamp based on the time interval. For these examples, time stamp component 522-4 may generate the time stamp. Time stamp component 522-4, may also base this time stamp in accordance with a network synchronized time maintained with nodes in the network fabric according to IEEE 1588.

According to some examples, logic flow 600 at block 610 may send the one or more packets to the portion of nodes and include the time stamp with at least one of the one or more packets to indicate a synchronized time for the portion of nodes to execute the command. For these examples, send component 522-5 may cause the one or more packets to be sent to the portion of nodes.

FIG. 7 illustrates an example of a first storage medium. As shown in FIG. 7, the first storage medium includes a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
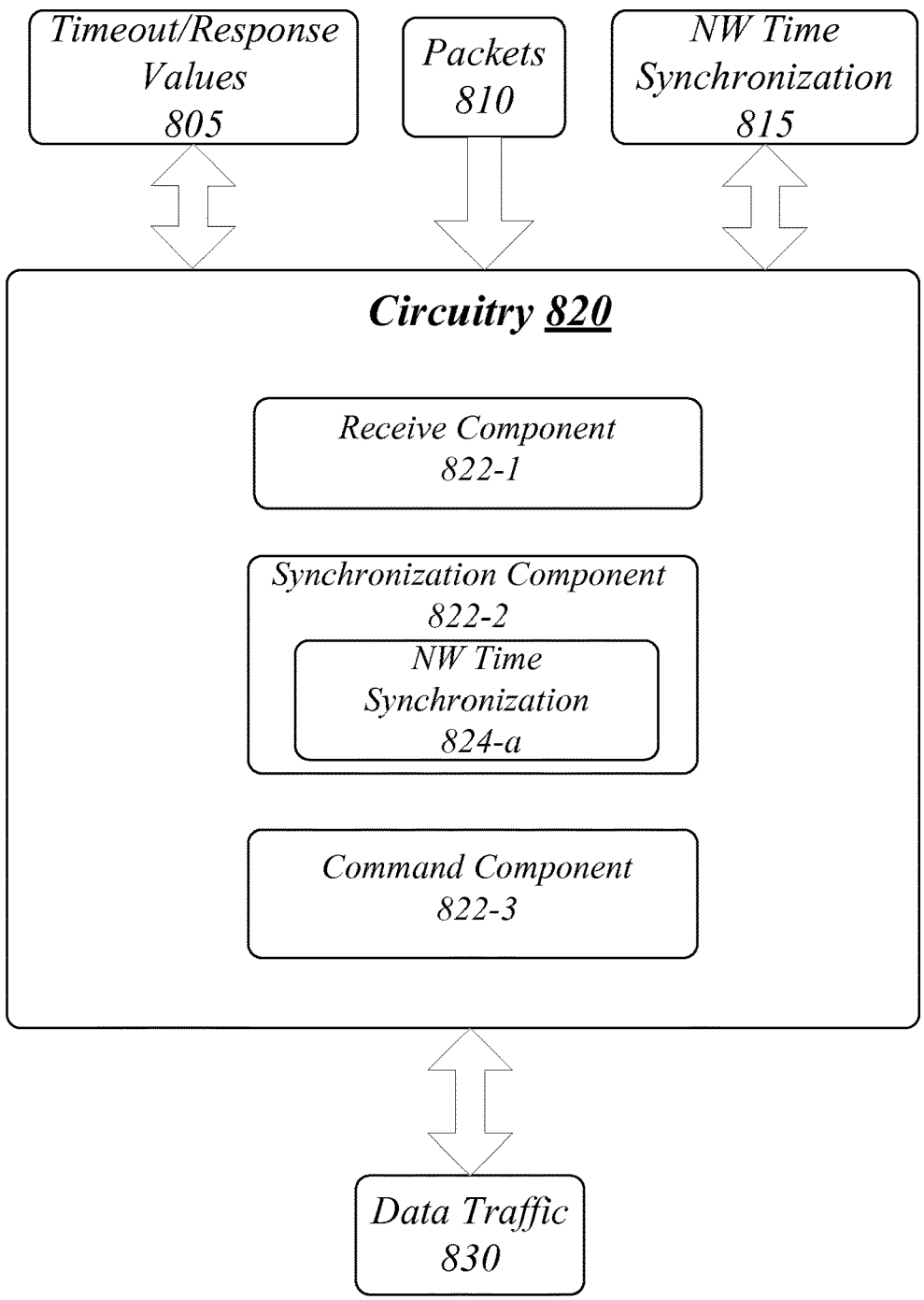
FIG. 8 illustrates an example block diagram for a second apparatus.

FIG. 8 illustrates a block diagram for an example second apparatus. As shown in FIG. 8, the example second apparatus includes apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820 maintained at a node (e.g., computing node) in a network fabric. Circuitry 820 arranged to execute one or more software components 822-$a$. It is worthy to note that "a" and "b" and "c" and similar designators as used herein are intended to be variables representing any positive integer. Thus, for example, if an implementation sets a value for a=3, then a complete set of software components 822-$a$ may include components 822-1, 822-2 or 822-3. The examples are not limited in this context.

In some examples, as shown in FIG. 8, apparatus 800 includes circuitry 820. Circuitry 820 may be part of host processor circuitry at the node in the network fabric (e.g., nodes 110-2, 110-3 or 110-$n$). Circuitry 820 may be generally arranged to execute one or more software components 822-$a$. Circuitry 820 may be any of various commercially available processors to include but not limited to the processors mentioned above for apparatus 500. Also, according to some examples, circuitry 820 may also be an ASIC and at least some components 822-$a$ may be implemented as hardware elements of the ASIC.

In some examples, apparatus 800 may include a receive component 822-1. Receive component 822-1 may be executed by circuitry 820 to receive one or more packets including a command (e.g., a reconfiguration command). For these examples, the one or more packets may be included with packets 810.

According to some examples, apparatus 800 may also include a synchronization component 822-2. Synchronization component 822-2 may be executed by circuitry 820 to determine a synchronized time for execution of the command with one or more other nodes in the network fabric based on a time stamp included in at least one of the one or more packets. For these examples, timeout/response values 805 including information to indicate a time needed for the node to receive and execute the command may have been previously exchanged with a fabric manager node for the network fabric. The time stamp may take into consideration that information exchanged with the fabric node manager that indicates how much time is needed for the node to receive and execute a command from the fabric manager node. Also, synchronization component 822-2 may be capable of maintaining NW time synchronization with nodes in the switch fabric via exchange of information included in NW time synchronization 815. This information include in NW time synchronization 815 may be exchanged in accordance with IEEE 1588 to maintain NW time synchronization 824-$a$. Synchronization component 822-2 may maintain NW time synchronization 824-$a$ via timing mechanisms according to IEEE 1588 and may determine the synchronized time using NW time synchronization 525-$b$.

In some examples, apparatus 800 may also include a command component 822-3. Command component 822-3 may be executed by circuitry 820 to execute the command responsive to reaching the synchronized time. For these examples, the command may include a reconfiguration command that changes a QoS level or route information for data traffic included in data traffic 830 between the node including apparatus 800 and the one or more other nodes in the network fabric. The QoS level or route information change may result in reconfiguring the data traffic flow over different links between the node including apparatus 800 and the one or more other nodes. The different links, for example, may include one or more virtual channels (e.g., configured according to the Infiniband Architecture specification).

Various components of apparatus 800 and a device or node implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 9:
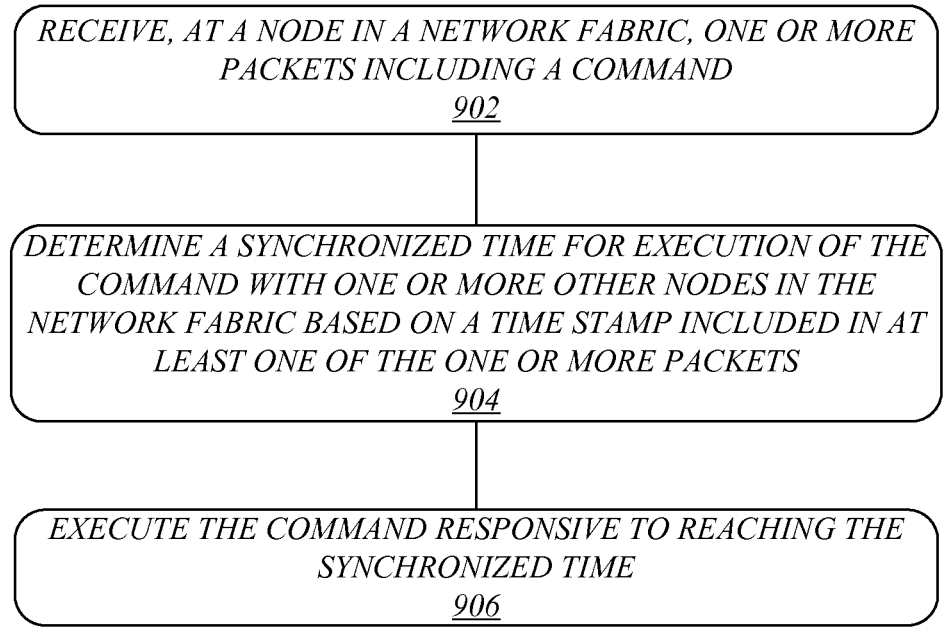
FIG. 9 illustrates an example of a second logic flow.

FIG. 9 illustrates an example of a second logic flow. As shown in FIG. 9 the second logic flow includes a logic flow 900. Logic flow 900 may be representative of some or all of the operations executed by one or more logic, features, or devices described herein, such as apparatus 800. More particularly, logic flow 900 may be implemented by at least receive component 822-1, synchronization component 822-2, or command component 822-3.

According to some examples, logic flow 900 at block 902 may receive, at a node in a network fabric, one or more packets including a command. For these examples, receive component 822-1 may receive the one or more packets.

In some examples, logic flow 900 at block 904 may determine a synchronized time for execution of the command with one or more other nodes in the network fabric based on a time stamp included in at least one of the one or more packets. For these examples, synchronization component 822-2 may determine the synchronized time.

According to some examples, logic flow 900 at block 906 may execute the command responsive to reaching the synchronized time. For these examples, command component 822-3 may execute the command responsive to reaching the synchronized time. The executed command may include a reconfiguration command and executing the reconfiguration command at the synchronized time may enable nodes in the network fabric to reconfigure at substantially the same time.

FIG. 10 illustrates an example of a second storage medium. As shown in FIG. 10, the second storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
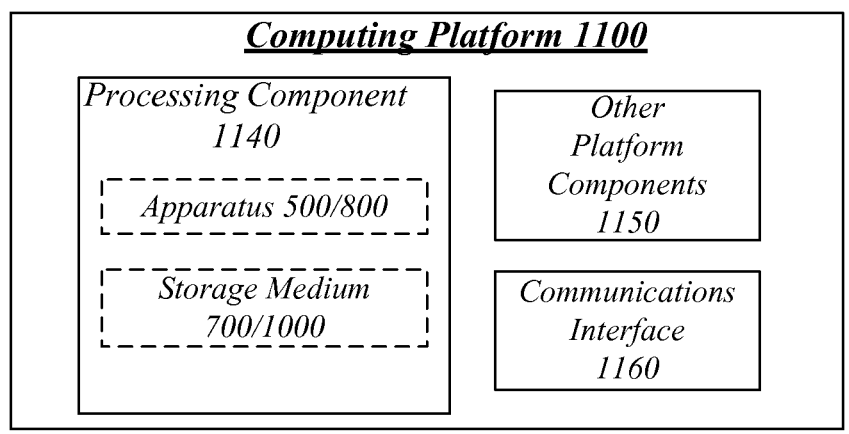
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may be implemented in a node or computing node in a switch fabric (e.g., nodes 110-1 to 110-*n* in fabric 105).

According to some examples, processing component 1140 may execute processing operations or logic for apparatus 500/800 and/or storage medium 700/1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification. Network communications may also occur according to Infiniband Architecture specification.

As mentioned above computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

EXAMPLE 1

An example apparatus may include circuitry for a fabric manager node of a network fabric. The apparatus may also include a time period component for execution by the circuitry to determine a separate time period for each node coupled to the fabric manager node to receive and execute a given command from the fabric manager node. The apparatus may also include a command component for execution by the circuitry to generate one or more packets including a command for at least a portion of nodes coupled to the fabric manager node. The apparatus may also include a time interval component for execution by the circuitry to determine a time interval needed for all nodes of the portion of nodes to receive and execute the command based on the determined separate time period for each node. The apparatus may also include a time stamp component for execution by the circuitry to generate a time stamp based on the time interval. The apparatus may also include a send component for execution by the circuitry to cause the one or more packets to be sent to the portion of nodes. The send component may cause the time stamp to be included with at least one of the one or more packets. The time stamp may indicate a synchronized time for the portion of nodes to execute the command.

EXAMPLE 2

The apparatus of example 1, the time period component may determine the separate time period for each node based on when the given command is sent from the fabric manager to when a respective node receives and executes the given command.

EXAMPLE 3

The apparatus of example 1, the command includes a reconfiguration command.

EXAMPLE 4

The apparatus of example 3, the reconfiguration command includes changing a QoS level or routing information for data traffic flowing between first and second nodes from among the portion of nodes and reconfiguring the data traffic flow over different links between the first and second nodes.

EXAMPLE 5

The apparatus of example 4, the different links may include one or more virtual channels between the first and second nodes.

EXAMPLE 6

The apparatus of example 3, the one or more packets including the reconfiguration command may include an indication to delay reconfiguration until the synchronized time is reached.

EXAMPLE 7

The apparatus of example 6, a last packet of the one or more packets may include the time stamp.

EXAMPLE 8

The apparatus of example 1, the fabric manager node and each node may be coupled to the fabric manager and arranged to operate in compliance with one or more standards or specifications associated with IEEE 1588-2008. The fabric manager node and each node coupled to the fabric manager may maintain network time synchronization according to IEEE 1588-2008.

EXAMPLE 9

The apparatus of example 1, the fabric manager node and each node coupled to the fabric manager may be arranged to operate in compliance with one or more standards or specifications associated with Infiniband specifications including Infiniband Architecture Specification, Volume 1, Release 1.2.1. The command component may generate one or more packets including the command in a MAD format.

EXAMPLE 10

The apparatus of example 9, the time period component may determine the separate time periods based, at least in part, on management timeout and response time values for each node to receive and respond to the given command sent via one or more packets in the MAD format from the fabric manager node.

EXAMPLE 11

The apparatus of example 1 may also include a digital display coupled to the circuitry to present a user interface view.

EXAMPLE 12

An example method may include determining, at a fabric manager node of a network fabric, a separate time period for each node coupled to the fabric manager node to receive and execute a given command from the fabric manager node. The example method may also include generating one or more packets including a command for at least a portion of nodes coupled to the fabric manager node. The example method may also include determining a time interval needed for all nodes of the portion of nodes to receive and execute the command based on the determined separate time period for each node. The example method may also include generating a time stamp based on the time interval. The example method may also include sending the one or more packets to the portion of nodes and include the time stamp with at least one of the one or more packets to indicate a synchronized time for the portion of nodes to execute the command.

EXAMPLE 13

The method of example 12, determining the separate time period for each node may include determining separate time periods for each node based on when the given command is sent from the fabric manager to when a respective node receives and executes the given command.

EXAMPLE 14

The method of example 12, the command may include a reconfiguration command.

EXAMPLE 15

The method of example 14, the reconfiguration command may include changing a QoS level or routing information for data traffic flowing between first and second nodes from among the portion of nodes and reconfiguring the data traffic flow over different links between the first and second nodes.

EXAMPLE 16

The method of example 15, the different links may include one or more virtual channels between the first and second nodes.

EXAMPLE 17

The method of example 14, the one or more packets may include the reconfiguration command having an indication to delay reconfiguration until the synchronized time is reached.

EXAMPLE 18

The method of example 17, a last packet of the one or more packets may include the time stamp.

EXAMPLE 19

The method of example 12, the fabric manager node and each node coupled to the fabric manager may be arranged to operate in compliance with one or more standards or specifications associated with IEEE 1588-2008. The fabric manager node and each node coupled to the fabric manager may maintain network time synchronization according to IEEE 1588-2008.

EXAMPLE 20

The method of example 12, the fabric manager node and each node coupled to the fabric manager may be arranged to operate in compliance with one or more standards or specifications associated with Infiniband specifications including Infiniband Architecture Specification, Volume 1, Release 1.2.1. The one or more packets for the command may be formatted as one or more MADs.

EXAMPLE 21

The method of example 12, the separate time period for each node may be determined based, at least in part, on management timeout and response time values for each node to receive and respond to the given command sent via one or more packets in the MAD format from the fabric manager node.

EXAMPLE 22

An example at least one machine readable medium may include a plurality of instructions that in response to being executed by system at a server cause the system to carry out a method according to any one of examples 12 to 21.

EXAMPLE 23

An example apparatus may include means for performing the methods of any one of examples 12 to 21.

EXAMPLE 24

An example at least one machine readable medium may include a plurality of instructions that in response to being executed by a system at a fabric manager node for a network fabric cause the system to determine a separate time period for each node coupled to the fabric manager node to receive and execute a given command from the fabric manager node. The instructions may also cause the system to generate one or more packets including a command for at least a portion of nodes coupled to the fabric manager node. The instructions may also cause the system to determine a time interval needed for all nodes of the portion of nodes to receive and execute the command based on the determined separate time period. The instructions may also cause the system to generate a time stamp based on the time interval and n the send the one or more packets to the portion of nodes and include the time stamp with at least one of the one or more packets to indicate a synchronized time for the portion of nodes to execute the command.

EXAMPLE 25

The at least one machine readable medium of example 24, the separate time period may be determined for each node based on when the given command is sent from the fabric manager to when a respective node receives and executes the given command.

EXAMPLE 26

The at least one machine readable medium of example 24, the command may include a reconfiguration command.

EXAMPLE 27

The at least one machine readable medium of example 26, the reconfiguration command may include changing a QoS level or routing information for data traffic flowing between first and second nodes from among the portion of nodes and reconfiguring the data traffic flow over different links between the first and second nodes.

EXAMPLE 28

The at least one machine readable medium of example 27, the different links may include one or more virtual channels between the first and second nodes.

EXAMPLE 29

The at least one machine readable medium of example 24, the one or more packets may include the reconfiguration command including an indication to delay reconfiguration until the synchronized time is reached.

EXAMPLE 30

The at least one machine readable medium of example 29, a last packet of the one or more packets may include the time stamp.

EXAMPLE 31

The at least one machine readable medium of example 24, the fabric manager node and each node coupled to the fabric manager may be arranged to operate in compliance with one or more standards or specifications associated with IEEE 1588-2008, the fabric manager node and each node coupled to the fabric manager to maintain network time synchronization according to IEEE 1588-2008.

EXAMPLE 32

The at least one machine readable medium of example 24, the fabric manager node and each node coupled to the fabric manager may be arranged to operate in compliance with one or more standards or specifications associated with Infiniband specifications including Infiniband Architecture Specification, Volume 1, Release 1.2.1. For this example, the one or more packets including the command may be formatted as one or more MADs.

EXAMPLE 33

The at least one machine readable medium of example 24, the separate time period for each node determined may be based, at least in part, on management timeout and response time values for each node to receive and respond to the given command sent via one or more packets in the MAD format from the fabric manager node.

EXAMPLE 34

An example apparatus may include circuitry for a node in a network fabric. The apparatus may also include a receive component for execution by the circuitry to receive one or more packets including a command. The apparatus may also include a synchronization component for execution by the circuitry to determine a synchronized time for execution of the command with one or more other nodes in the network fabric based on a time stamp included in at least one of the one or more packets. The apparatus may also include a command component for execution by the circuitry to execute the command responsive to reaching the synchronized time.

EXAMPLE 35

The apparatus of example 34, the command may include a reconfiguration command from a fabric manager node in the network fabric.

EXAMPLE 36

The apparatus of example 35, the reconfiguration command when executed may include the command component to change a QoS level for or routing information data traffic flowing between the node and the one or more other nodes in the network fabric and reconfigure the data traffic flow over different links between the node and the one or more other nodes.

EXAMPLE 37

The apparatus of example 35, the different links may include one or more virtual channels between the node and the one or more other nodes.

EXAMPLE 38

The apparatus of example 35, the one or more packets may include the reconfiguration command including an indication to delay reconfiguration until the synchronized time is reached.

EXAMPLE 39

The apparatus of example 38, a last packet of the one or more packets may include the time stamp.

EXAMPLE 40

The apparatus of example 34, the node may be arranged to operate in compliance with one or more standards or specifications associated with IEEE 1588-2008. For this example, the node may maintain network time synchronization with the one or more other nodes according to IEEE 1588-2008.

EXAMPLE 41

The apparatus of example 34, the node may be arranged to operate in compliance with one or more standards or specifications associated with Infiniband specifications including Infiniband Architecture Specification, Volume 1, Release 1.2.1. For this example, the one or more packets including the command may be one or more MADs.

EXAMPLE 42

The apparatus of example 34 may also include a digital display coupled to the circuitry to present a user interface view.

EXAMPLE 43

An example method may include receiving, at a node in a network fabric, one or more packets including a command. The method may also include determining a synchronized time for execution of the command with one or more other nodes in the network fabric based on a time stamp included in at least one of the one or more packets. The method may also include executing the command responsive to reaching the synchronized time.

EXAMPLE 44

The method of example 43, the command may include a reconfiguration command from a fabric manager node in the network fabric.

EXAMPLE 45

The method of example 44, the reconfiguration command may include changing a QoS level for or routing information data traffic flowing between the node and the one or more other nodes in the network fabric and reconfiguring the data traffic flow over different links between the node and the one or more other nodes.

EXAMPLE 46

The method of example 45, the different links may include one or more virtual channels between the node and the one or more other nodes.

EXAMPLE 47

The method of example 44, the one or more packets may include the reconfiguration command including an indication to delay reconfiguration until the synchronized time is reached.

EXAMPLE 48

The method of example 47, a last packet of the one or more packets may include the time stamp.

EXAMPLE 49

The method of example 43, the node may be arranged to operate in compliance with one or more standards or specifications associated with IEEE 1588-2008. For this example, the node to maintain network time synchronization with the one or more other nodes according to IEEE 1588-2008.

EXAMPLE 50

The method of example 43, the node may be arranged to operate in compliance with one or more standards or specifications associated with Infiniband specifications including Infiniband Architecture Specification, Volume 1, Release 1.2.1. For this example, the one or more packets including the command may be one or more MADs.

EXAMPLE 51

An example at least one machine readable medium may include a plurality of instructions that in response to being executed by system at a server may cause the system to carry out a method according to any one of examples 43 to 50.

EXAMPLE 52

An example apparatus may include means for performing the methods of any one of examples 43 to 50.

EXAMPLE 53

At least one machine readable medium may include a plurality of instructions that in response to being executed by a system at a node in a network fabric may cause the system to receive one or more packets including a command. The instructions may also cause the system to determine a synchronized time for execution of the command with one or more other nodes in the network fabric based on a time stamp included in at least one of the one or more packets. The instructions may also cause the system to execute the command responsive to reaching the synchronized time.

EXAMPLE 54

The at least one machine readable medium of example 53, the command may include a reconfiguration command from a fabric manager node in the network fabric.

EXAMPLE 55

The at least one machine readable medium of example 53, the reconfiguration command may include changing a QoS level or routing information for data traffic flowing between the node and the one or more other nodes in the network fabric and reconfiguring the data traffic flow over different links between the node and the one or more other nodes.

EXAMPLE 56

The at least one machine readable medium of example 55, the different links may include one or more virtual channels between the node and the one or more other nodes.

EXAMPLE 57

The at least one machine readable medium of example 54, the one or more packets including the reconfiguration command may include an indication to delay reconfiguration until the synchronized time is reached.

EXAMPLE 58

The at least one machine readable medium of example 57, a last packet of the one or more packets may include the time stamp.

EXAMPLE 59

The at least one machine readable medium of example 53, the node may be arranged to operate in compliance with one or more standards or specifications associated with IEEE 1588-2008, the node to maintain network time synchronization with the one or more other nodes according to IEEE 1588-2008.

EXAMPLE 60

The at least one machine readable medium of example 53, the node may be arranged to operate in compliance with one or more standards or specifications associated with Infiniband specifications including Infiniband Architecture Specification, Volume 1, Release 1.2.1. For this example, the one or more packets including the command may be one or more MADs.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory machine readable medium comprising a plurality of instructions that in response to being executed by a system at a fabric manager node for a network fabric cause the system to:
   determine a plurality of separate time periods for a plurality of nodes coupled to the fabric manager node, the plurality of separate time periods comprising a period of time required for the plurality of nodes to individually execute a command from the fabric manager node;
   generate one or more packets comprising an indication to delay execution of the command for the plurality of nodes coupled to the fabric manager node based on a synchronized time indicated in a time stamp;
   determine a time interval needed for the plurality of nodes to collectively receive and execute the command based on the plurality of separate time periods;
   generate the time stamp based on the time interval; and
   send the one or more packets to at least one of the plurality of nodes comprising the time stamp.

2. The at least one non-transitory machine readable medium of claim 1, the command comprises a reconfiguration command.

3. The at least one non-transitory machine readable medium of claim 2, the reconfiguration command comprises changing a quality of service (QoS) level or routing information for data traffic flowing between first and second nodes of the plurality of nodes and reconfiguring the data traffic to flow over different links between the first and second nodes.

4. The at least one non-transitory machine readable medium of claim 3, the different links comprising one or more virtual channels between the first and second nodes.

5. The at least one non-transitory machine readable medium of claim 1, a last packet of the one or more packets comprising the time stamp.

6. The at least one non-transitory machine readable medium of claim 1, the plurality of separate time periods determined based, at least in part, on management timeout and response time values for the plurality of nodes to receive and respond to the command.

7. The at least one non-transitory machine readable medium of claim 1, the indication provided via an indicator field of at least one of the one or more packets.

8. The at least one non-transitory machine readable medium of claim 1, the indication provided via an indicator field of a first packet of the one or more packets,
the time stamp provided via a second packet of the one or more packets.

9. The at least one non-transitory machine readable medium of claim 1, at least one of the one or more packets comprising an indicator field operative to be set to provide the indication to delay execution of the command.

10. A method comprising:
determining, at a fabric manager node of a network fabric, a plurality of separate time periods for a plurality of nodes coupled to the fabric manager node, the plurality of separate time periods comprising a period of time required for the plurality of nodes to individually execute a command from the fabric manager node;
generating one or more packets comprising an indication to delay execution of the command for the plurality of nodes coupled to the fabric manager node based on a synchronized time indicated in a time stamp;
determining a time interval needed for the plurality of nodes to collectively receive and execute the command based on the plurality of separate time periods;
generating the time stamp based on the time interval; and
sending the one or more packets to at least one of the plurality of nodes comprising the time stamp.

11. The method of claim 10, the command comprises a reconfiguration command.

12. The method of claim 11, the reconfiguration command comprises changing a quality of service (QoS) level or routing information for data traffic flowing between first and second nodes of the plurality of nodes and reconfiguring the data traffic to flow over different links between the first and second nodes.

13. The method of claim 10, the plurality of separate time periods determined based, at least in part, on management timeout and response time values for the plurality of nodes to individually execute the command.

14. The method of claim 10, the indication provided via an indicator field of at least one of the one or more packets.

15. The method of claim 10, the indication provided via an indicator field of a first packet of the one or more packets,
the time stamp provided via a second packet of the one or more packets.

16. The method of claim 10, at least one of the one or more packets comprising an indicator field operative to be set to provide the indication to delay execution of the command.

17. An apparatus comprising:
circuitry for a node in a network fabric comprising a network manager node;
a receive component for execution by the circuitry to receive one or more packets provided by the network manager node to the node and one or more other nodes, the one or more packets comprising a command and an indication to delay execution of the command based on a synchronized time indicated in a time stamp;
a synchronization component for execution by the circuitry to determine the synchronized time for execution of the command based on the time stamp, the time stamp generated based on a time interval needed for the node and the one or more other nodes to collectively execute the command, the time interval determined based on a plurality of separate time periods comprising a period of time required for the node and the one or more other nodes to individually execute the command; and
a command component for execution by the circuitry to execute the command responsive to reaching the synchronized time.

18. The apparatus of claim 17, the command comprises a reconfiguration command from a fabric manager node in the network fabric, the reconfiguration command to change a quality of service (QoS) level or routing information for data traffic flowing between the node and the one or more other nodes in the network fabric and reconfigure the data traffic to flow over different links between the node and the one or more other nodes.

19. The apparatus of claim 18, a last packet of the one or more packets comprising the time stamp.

20. The apparatus of claim 17, the indication provided via an indicator field of at least one of the one or more packets.

21. The apparatus of claim 17, the indication provided via an indicator field of a first packet of the one or more packets,
the time stamp provided via a second packet of the one or more packets.

22. At least one non-transitory machine readable medium comprising a plurality of instructions that in response to being executed by a system at a node in a network fabric comprising a network node manager, cause the system to:
receive one or more packets provided by the network manager node to the node and one or more other nodes, the one or more packets comprising a command and an indication to delay execution of the command based on a synchronized time indicated in a time stamp;
determine the synchronized time for execution of the command based on the time stamp, the time stamp generated based on a time interval needed for the node and the one or more other nodes to collectively execute the command, the time interval determined based on a plurality of separate time periods comprising a period of time required for the node and the one or more other nodes to individually execute the command; and
execute the command responsive to reaching the synchronized time.

23. The at least one non-transitory machine readable medium of claim 22, the indication provided via an indicator field of at least one of the one or more packets.

24. The at least one non-transitory machine readable medium of claim 22, the indication provided via an indicator field of a first packet of the one or more packets, the time stamp provided via a second packet of the one or more packets.

* * * * *